United States Patent
Liu et al.

(10) Patent No.: US 9,589,324 B1
(45) Date of Patent: Mar. 7, 2017

(54) OVERSHOOT PROTECTION OF UPSCALED IMAGES

(71) Applicant: Pixelworks, Inc., Portland, OR (US)

(72) Inventors: Guodong Liu, Shanghai (CN); Bob Zhang, Santa Clara, CA (US); Neil Woodall, Newport Beach, CA (US); Junhua Chen, Shanghai (CN); Yue Ma, Pleasanton, CA (US)

(73) Assignee: PIXELWORKS, INC., Portland, OR (US)

( * ) Notice: Subject to any disclaimer, the term of this patent is extended or adjusted under 35 U.S.C. 154(b) by 298 days.

(21) Appl. No.: 14/227,732

(22) Filed: Mar. 27, 2014

(51) Int. Cl.
*G06K 9/40* (2006.01)
*G06T 3/40* (2006.01)

(52) U.S. Cl.
CPC .................. *G06T 3/4076* (2013.01)

(58) Field of Classification Search
CPC .............. G06K 9/2054; G06K 2209/01; G06T 3/4069; G06T 3/00; G06T 3/4076; H04N 1/3871; H04N 1/40068; H04N 7/012; G09G 2320/0242
USPC .................. 382/300, 261; 348/500, 449, 446
See application file for complete search history.

(56) References Cited

U.S. PATENT DOCUMENTS

| | | | | |
|---|---|---|---|---|
| 2007/0206844 | A1* | 9/2007 | Russakoff | G06K 9/38 382/132 |
| 2007/0253479 | A1* | 11/2007 | Mukherjee | H03M 7/30 375/240.1 |
| 2008/0267533 | A1* | 10/2008 | Ida | G06T 3/403 382/299 |
| 2009/0009513 | A1* | 1/2009 | van den Hengel | G06T 7/0071 345/420 |
| 2009/0009531 | A1* | 1/2009 | Sudo | H04N 5/23293 345/629 |
| 2009/0022429 | A1* | 1/2009 | Longacre, Jr. | G06K 9/228 382/313 |
| 2010/0008580 | A1* | 1/2010 | Mizuno | G06K 9/2054 382/176 |
| 2010/0135588 | A1* | 6/2010 | Au | G06T 3/403 382/243 |
| 2010/0322536 | A1* | 12/2010 | Tezuka | G06T 3/00 382/300 |
| 2012/0093431 | A1* | 4/2012 | Liba | G06T 7/403 382/260 |

OTHER PUBLICATIONS

Eun Mi Kim et al., "Optimal Edge Detection Using Perfect Sharpening of Ramp Edges", M. Gavrilova et al. (Eds.): ICCSA 2006, LNCS 3982, pp. 1190-1199, 2006. Springer-Verlag Berlin Heidelberg 2006.*

* cited by examiner

*Primary Examiner* — Mekonen Bekele
(74) *Attorney, Agent, or Firm* — Marger Johnson

(57) ABSTRACT

A method of processing video data includes upscaling an input low resolution image to a high resolution image using a processor, detecting monotonicity in a direction normal to an edge in a low resolution neighborhood in the input low resolution image, and correcting pixels in a high resolution neighborhood of the high resolution image corresponding to the low resolution neighborhood to preserve at least some of the monotonicity.

7 Claims, 9 Drawing Sheets

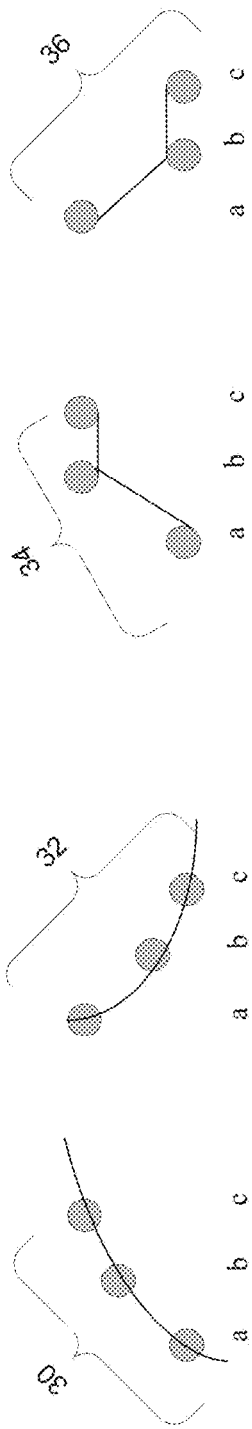
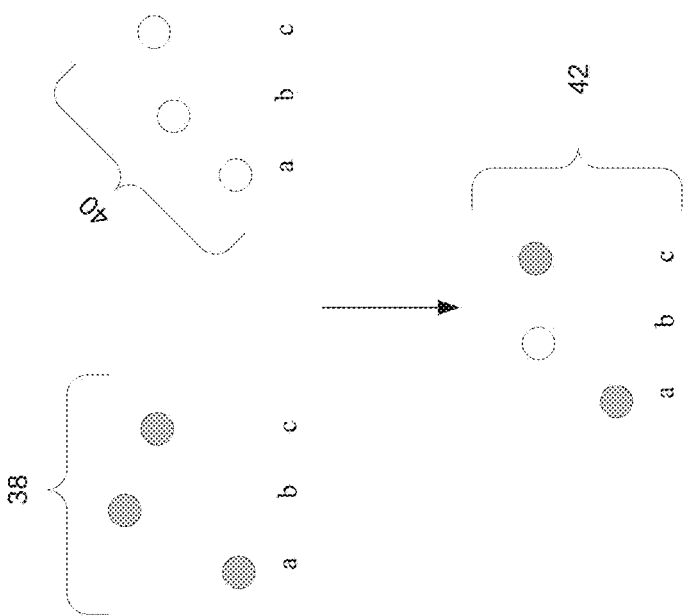

OVERSHOOT PROTECTION OF UPSCALED IMAGES

BACKGROUND

Super resolution techniques provide a way to take original, low resolution images and generate images having a higher resolution. These techniques may use multiple frames or single frames of low resolution images. Single frame super resolution techniques include self-similarity super resolution (SSSR), in which similarities across a single frame of a low resolution image are exploited to generate the higher resolution images.

SSSR generally performs well to recover high frequency detail and keep sharpness of edges after image upscaling, including graphics-based images. Graphics image data may consist of simple pixel structures such as lines, characters, rectangles, circles, icons, cartoons, etc. These structures have regular and non-random shapes and possess sufficient self-similarities across different scales making them appropriate for SSSR processing.

However, upscaling of graphics images using SSSR often results in annoying artifacts. One such artifact comes from 'over filtering,' also referred to as overshooting, that causes an artifact called ringing, in which rings near strong or sharp edges and non-uniform color or gray patches appear in the resulting high resolution image. Graphics do not completely follow to the basic image model of common video. For typical video, the low resolution images are generated by convolving its corresponding high resolution image with a low pass filter and then down sampling it. One example is the optical blur filter placed on top of image sensors when capturing the low resolution image. The input low resolution graphics usually have very sharp edges like step signals with very little transition or blurring.

It is often not possible to determine at the super resolution stage of processing whether or not the input follows the basic imaging model or not. This results in super resolution upscaling results that are similar or even worse than other scaling approaches. However, it is possible to preserve the monotonicity in the normal direction and homogeneity in the edge direction. Effectively remove the artifacts mentioned above for each color channel after the SSSR or other scaling process.

BRIEF DESCRIPTION OF THE DRAWINGS

FIGS. 3-4 show examples of edges in common graphics.

FIG. 5 shows a graphic example of correcting an edge in a high resolution image.

DETAILED DESCRIPTION OF THE EMBODIMENTS

Graphics often keep monotonicity of pixel values in the normal direction of edges and maintain homogeneity of pixel values in the tangent direction of edges. Graphics, as that term is used, here includes any images that have 'hard' edges, with transitions from one color to the other along clear lines. Generally, this does not include images from photographs and videos. It is necessary to preserve these features after graphics upscaling/super-resolution. If monotonicity and homogeneity are not preserved, overshooting and ringing artifacts occur, making the edges unnatural.

Figure 1:
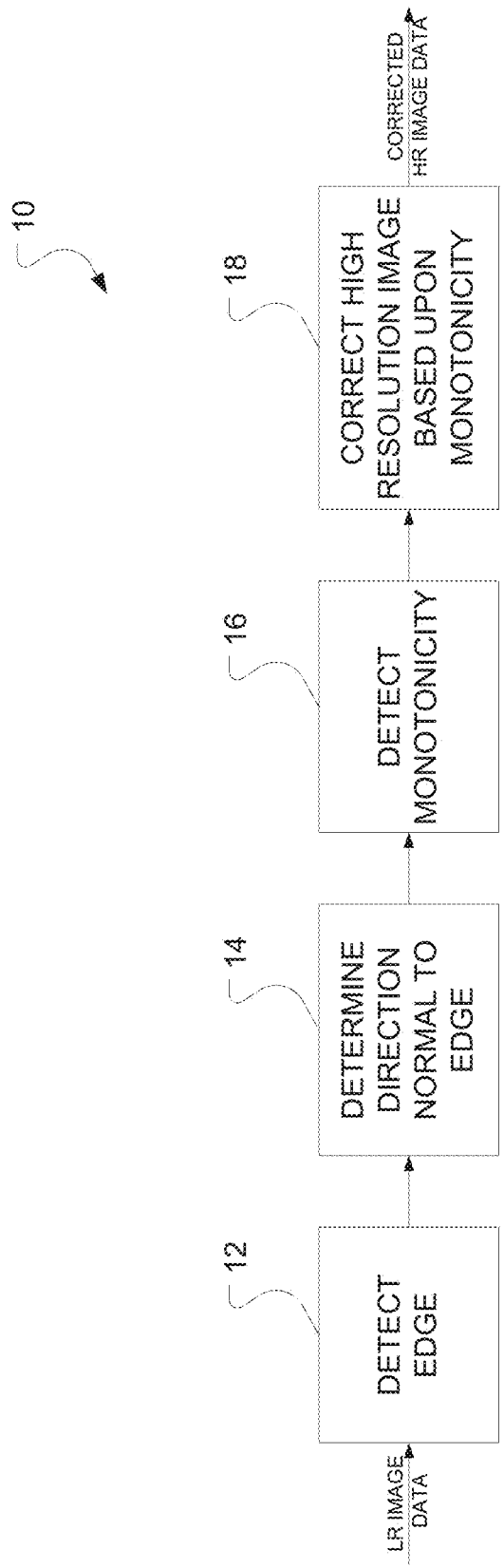
FIG. 1 shows an embodiment of a method of preserving monotonicity and homogeneity in graphics.

FIG. 1 shows an overview of a method 10 to preserve monotonicity and homogeneity when upscaling graphics. At 12, the edge is detected in the image data. This will be discussed in more detail with reference to further figures. Monotonicity typically increases or decreases pixel values in a direction normal to an edge, so the process determines the normal direction at 14. Once the direction is determined, the monotonicity is detected at 16 to identify if it is increasing or decreasing. This information is then used to correct the high resolution image based upon the monotonicity information at 18. The process takes the low resolution image data used at the input to correct the high resolution image data as the output. The initial high resolution image data is generated by the super resolution or other upscaling process. This process corrects the high resolution image data, it does not itself generate it.

Figure 2:
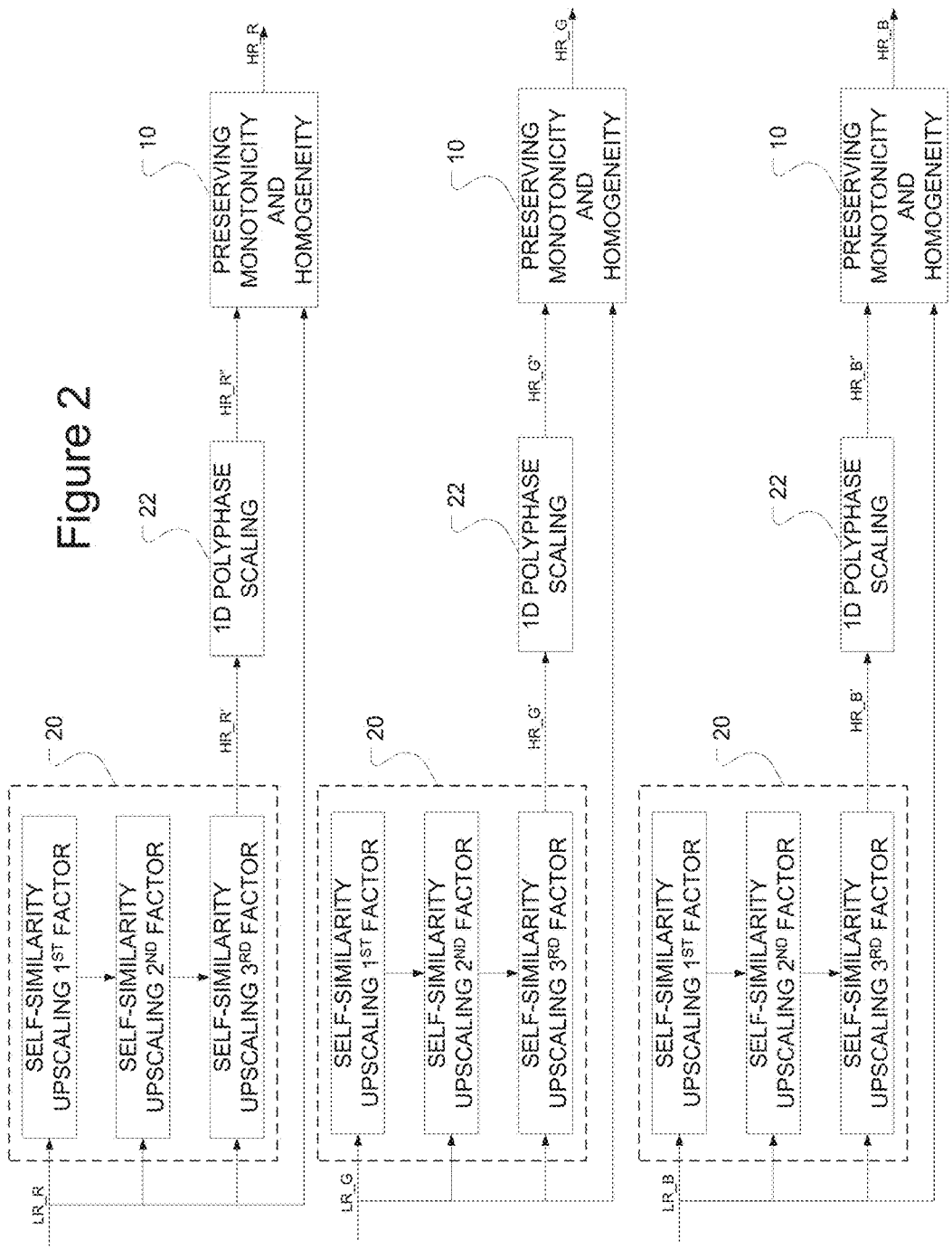
FIG. 2 shows a more detailed embodiment of a method of preserving monotonicity and homogeneity in graphics.

FIG. 2 shows a more detailed method of a super resolution method to generate high resolution data, with a post processing block to improve edges and remove artifacts such as overshooting and ringing, etc. This super resolution process is done in RGB space. This post-processing method may be used for any upscaling or super-resolution process and in any color space, as the only requirements are that both the high and original low resolution images are available.

This logic can be easily used after any graphics upscaling process, including other super resolution processes than self-similarity super resolution such as multi-frame super resolution. This process can also be utilized after self-similarity based upscaling at each layer in self-similarity based SR. For example in FIG. 2, it can be located between the self-similarity scaling blocks in addition to the final position. It can give better image quality than only doing this logic on the final SR result, but involves more processing. The preservation process will typically occur in a video post processor, but may be done in the main video processor after the image data has been otherwise processed.

In FIG. 2, the blocks 20 are identical, but replicated for each of the colors Red, Green and Blue. The self-similarity super-resolution (SSSR) process typically involves multiple iterations to achieve a particular scale. In one embodiment, the SSSR process scales the data from 1×, or its original resolution, to 1.25× as the first factor. It then scales the 1.25× data and scales it to 1.56× as a second factor, and from 1.56× to 1.95× as the third factor. Typically, although not necessarily required, the resulting high resolution image data undergoes some sort of further scaling, such as the polyphase scaling at 22. The resulting data would then be corrected to preserve monotonicity and homogeneity at 10, discussed in FIG. 1.

FIGS. 3 and 4 show examples of common types of edges in graphics at the pixel level. The three pixels a, b, and c form at least part of an edge in graphics with projections of possible edges for reference. Edges 30 and 32 of FIG. 3 may consist of curves, with edges 34 and 36 showing more linear edges like a step signal. FIG. 5 shows a graphical representation of an edge 38 in the resulting high resolution image data. The edge in the original, low resolution image data is shown at 40. As can be seen, there is a significant difference between the two. By application of the embodiments discussed here, the edge 38 is adjusted to preserve the monotonicity and to correct the edge 38 to be the edge 42. The middle pixel of edge 38 is changed. Note that the shading of the pixels of edge 38 and edge 40 is to identify the source as either the high resolution image data or the low resolution image data, not to demonstrate any color or black value. The shading of the pixels of edge 42 is to identify the sources as either the initial high resolution image data or the corrected high resolution image data, not to demonstrate any color or black value.

As can be seen in FIG. 5, the adjusted pixel and its adjacent pixels in the normal direction keep their monotonicity after post-processing. The adjusted pixel may be closer to the median pixel in a normal direction in a neighborhood local to the pixel in the high resolution image data, and closer to the range of the corresponding low resolution neighborhood. Generally, the process detects monotonicity in the normal direction of the edge in the low resolution image and then uses that information to correct the high resolution image based on the monotonicity in the corresponding neighborhood in the low resolution image. The embodiments here rely upon a 3×3 neighborhood, but no limitation to that neighborhood size is intended nor should any be implied. Other size neighborhoods may be used and the selection of which is left up to the system designer.

Figure 6:
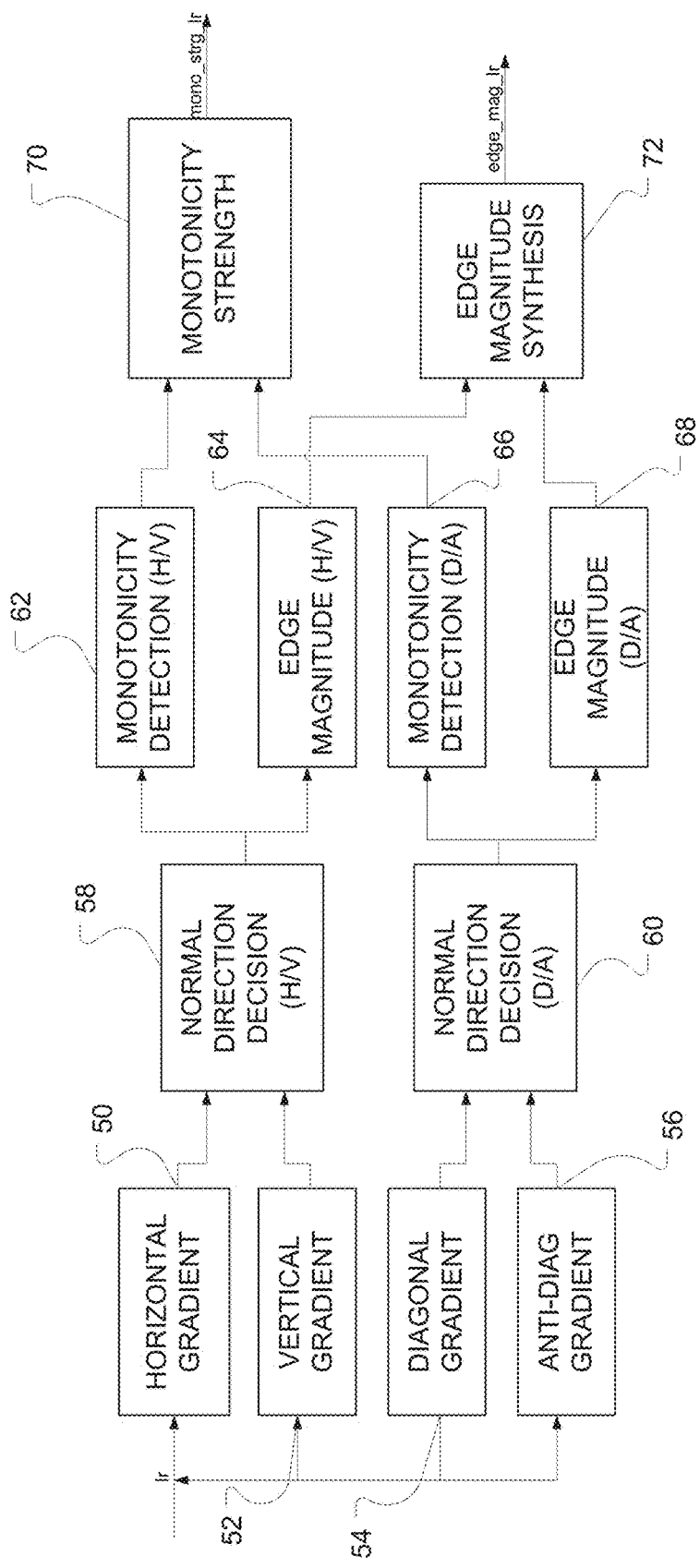
FIG. 6 shows an embodiment of a method of detecting monotonicity.

An overview of the process of determining monotonicity in LR neighborhood is shown in FIG. 6. The process determines gradients within the neighborhood. The gradients are the horizontal gradient 50, the vertical gradient 52, the diagonal gradient 54 and the anti-diagonal gradient 56.

Figure 7:
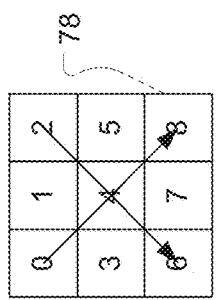
FIG. 7 shows an example of a pixel neighborhood.

For any edge, two normal directions are selected, where the normal direction is a direction perpendicular to the edge. One is selected from horizontal and vertical gradient directions; the other is selected from diagonal and anti-diagonal gradient directions. For purposes of this discussion, the diagonal direction is from the top right of a neighborhood towards the bottom left. In the example 3×3 block of FIG. 7, the diagonal direction can be seen from 2 to 6. The anti-diagonal, or opposite diagonal, is from 0 to 8. The process detects monotonicity, calculates the edge magnitude and then synthesizes the results.

The process of FIG. 6 use a 3×3 pixel neighborhood, whose elements are pix_lr(i), i=0, 1, . . . , 8. The gradients may be determined as follows.
Horizontal gradient: lr_grad_h=LPF((abs(pix_lr(3)−pix_lr(4))+abs(pix_lr(5)−pix_lr(4)))/2, (abs(pix_lr(0)−pix_lr(1))+abs(pix_lr(2)−pix_lr(1)))/2, (abs(pix_lr(6)−pix_lr(7))+abs(pix_lr(8)−pix_lr(7)))/2);
Vertical gradient: lr_grad_v=LPF((abs(pix_lr(1)−pix_lr(4))+abs(pix_lr(7)−pix_lr(4)))/2, (abs(pix_lr(0)−pix_lr(3))+abs(pix_lr(6)−pix_lr(3)))/2, (abs(pix_lr(2)−pix_lr(5))+abs(pix_lr(8)−pix_lr(5)))/2);
Diagonal (D) gradient: lr_grad_d=LPF((abs(pix_lr(2)−pix_lr(4))+abs(pix_lr(6)−pix_lr(4)))/2, abs(pix_lr(1)−pix_lr(3)), abs(pix_lr(5)−pix_lr(7))); and
Anti-diagonal (AD) gradient: lr_grad_a=LPF((abs(pix_lr(0)−pix_lr(4))+abs(pix_lr(8)−pix_lr(4)))/2, abs(pix_lr(1)−pix_lr(5)), abs(pix_lr(3)−pix_lr(7))).

Figure 8:
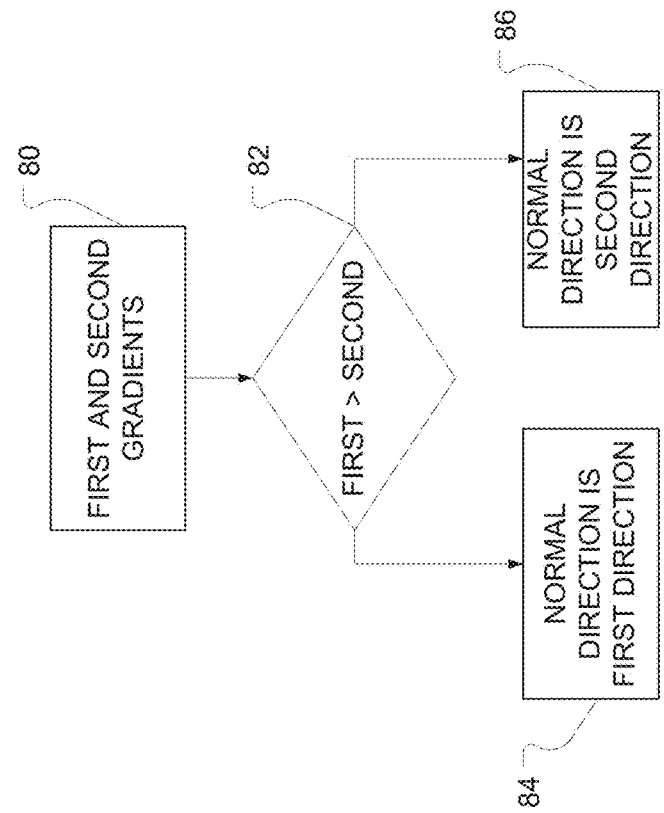
FIG. 8 shows an embodiment of a method of deciding on a direction normal to an edge.

The low pass filter above can be implemented as an average, a median or other rank order filter, with a median filter seeming to have the best results. The process decides the normal direction for each pair of gradients at 58 and 60 in FIG. 6. This decision may be made as shown in FIG. 8. The process divides the four directions into two groups: horizontal/vertical group, diagonal/anti-diagonal group. One normal direction is detected for each group. Because the normal direction decision method is same for both groups, FIG. 8 only shows one group decision as an example. The first and second gradients could be the horizontal and vertical gradients as the first and second gradients, or they could be the diagonal and anti-diagonal gradients at 80. At 82, the two gradients are compared at 82 and then the decision results from the comparison at either 84 or 86.

Using the horizontal and vertical gradients as an example, the comparison may be as follows. If lr_grad_h>lr_grad_v, the normal direction is the horizontal direction, and the maximum difference gradient is max_diff_hv=lr_grad_h, and the minimum difference gradient is min_diff_hv=lr_grad_v. Similarly, if lr_grad_h<=lr_grad_v, the normal direction is the vertical direction, and max_diff_hv=lr_grad_v, min_diff_hv=lr_grad_h.

Returning to FIG. 6, the process calculates the edge magnitude for both of the normal directions at 64 and 68. The method is to compare the gradients of two orthogonal directions to arrive at the edge magnitude (mag) for each pair as follows:
    mag_hv=max_diff_hv−min_diff_hv*Edge_Norm_K;
    mag_ad=max_diff_ad−min_diff_ad*Edge_Norm_K;
Here, Edge_Norm_K is a gain to adjust the difference between two orthogonal directions. The main effect of the gain is to increase the sensitivity of the correction process when the edge is exactly horizontal or vertical, and when the edge is not strong.

Figure 9:
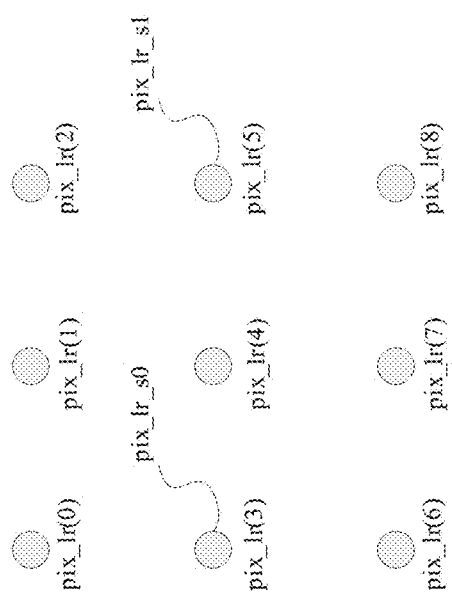

The embodiments here detect pixel monotonicity in both of the two potential normal directions. The detection method is same for both directions, referred to here as the H/V or HV direction and the D/A or DA direction. This discussion again focuses on the 3×3 neighborhood, with the understanding that it extends to any size of neighborhood desired. FIG. 9 shows that there are three pixels in the normal direction in a 3×3 neighborhood: two side pixels pix_lr_s0, in this example pix_lr(3), and pix_lr_s1, in this example pix_lr(5), and the central pixel pix_lr(4). In this embodiment, the direction will be horizontal, so pix_lr_s0=pix_lr(3), pix_lr_s1=pix_lr(5).

Figure 10:
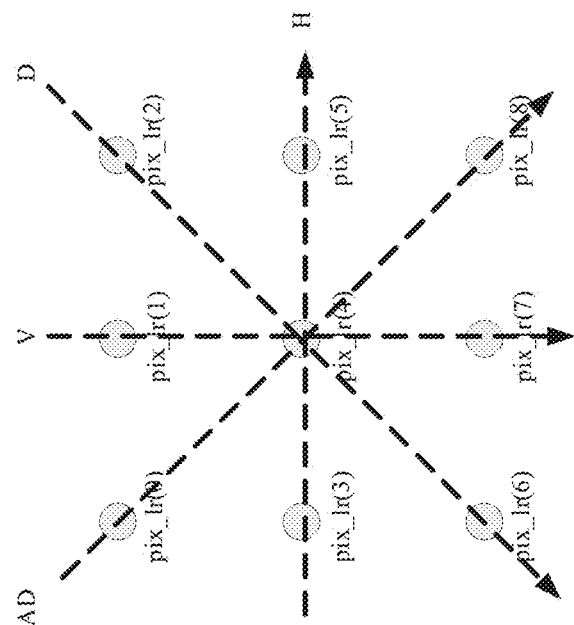
FIGS. 9 and 10 show graphical representations of pixel neighborhoods.

For other directions, the pix_lr_s0 and pix_lr_s1 differ. If the direction is vertical, pix_lr_s0=pix_lr(1), pix_lr_s1=pix_lr(7). For the diagonal direction (45 degrees), pix_lr_s0=pix_lr(2), pix_lr_s1=pix_lr(6). For the anti-diagonal direction (135 degree), pix_lr_s0=pix_lr(0), pix_lr_s1=pix_lr(8). FIG. 10 shows a graphical representation of the order of pix_lr_s0, pix_lr(4) and pix_lr_s1 in the four directions. The pixels are passed through from pix_lr_s0 to pix_lr_s1 by a line with an arrow.

Monotonicity can either be increasing or decreasing. The method discussed here compares the side pixels with the central pixel, to determine their minimal absolute difference and the sign of difference. The process calculates the pixel differences and the sign of these differences for the two cases. For the first case, where the monotonicity is increasing:
    pix_diff1=pix_lr_s0−(pix_lr(4)+Pix_Mono_Fluct);
    pix_diff2=pix_lr(4)−(pix_lr_s1+Pix_Mono_Fluct).
If pix_diff1<=0 and pix_diff2<=0; then mono_diff1=min(abs(pix_diff1), abs(pix_diff2)), and mono_sign1=−1. Otherwise, mono_diff1=0, and mono_sign1=0. The parameter Pix_Mono_Fluct is a fluctuation threshold for judging whether monotonicity takes place.

For the second case where monotonicity is decreasing:
pix_diff3=(pix_lr_s0+Pix_Mono_Fluct)−pix_lr(4);
pix_diff4=(pix_lr(4)+Pix_Mono_Fluct)−pix_lr_s1.
If pix_diff3>=0 and pix_diff4>=0, then mono_diff2=min (abs(pix_diff3), abs(pix_diff4)) and mono_sign2=1. Otherwise, mono_diff2=0, and mono_sign2=0.

After determining the monotonicity differences and their respective signs, the process selects the correct monotonicity difference and its sign based on the sign of pix_lr_s0 minus pix_lr_s1 from basic_diff=pix_lr_s0−pix_lr_s1. If basic_diff<0, then mono_diff=min(mono_diff1, abs(basic_diff)) and mono_sign=mono_sign1. Otherwise, mono_diff=min(mono_diff2, abs(basic_diff)) and mono_sign=mono_sign2.

Using the above method, two monotonicity values are derived. Mono_diff_hv is for the horizontal/vertical normal direction, and mono_diff_ad is for diagonal/anti-diagonal normal direction.

Monotonicity information is calculated for both normal directions. Typically, the real normal direction is between these selected two directions. In order to evaluate how strong the monotonicity is, the process may fuse these two directions based on the sign of monotonicity. The angle between the two normal directions is 45 degrees. The nearest side pixels of the two normal directions are on the same side of central pixels. If the pixels on one normal are monotonic, the pixels on the other normal should be monotonic and have same monotonicity sign, which needs be adjusted according to nearest pixel's arrangement. This excludes random textures from regular edges because these textures do not need overshooting reduction in order to avoid damaging them.

It may be necessary to adjust the monotonicity sign based on the nearest pixel's arrangement. If one normal is horizontal and the other is diagonal, pix_lr_s0_hv and pix_lr_s1_ad are on one side of central pixel, pix_lr_s1_hv and pix_lr_s0_ad are on the other side. The process assigns mono_sign_ad=−mono_sign_ad. For other cases, pix_lr_s0_hv and pix_lr_s0_ad are on one side of central pixel, pix_lr_s1_hv and pix_lr_s1_ad are on the other side. Therefore, it does not need to adjust the monotonicity signs.

The monotonicity strength is the maximal absolute value of monotonicity differences in two normal directions. However, they need to be consistent if they represent a true edge and not texture. That is, if the mono_diff_hv is greater than zero, then the mono_diff_ad should be greater than zero for a real edge. Therefore, if the two differences have different signs, then it is better to sum them so that the monotonicity strength is reduced and the function is continuous. If mono_sign_hv*mono_sign_ad>=0, then mono_diff_fuse=max(mono_diff_hv, mono_diff_ad). If mono_sign_hv*mono_sign_ad<0, then mono_diff_fuse=abs(mono_diff_hv−mono_diff_ad) and mono_strg_lr=mono_diff_fuse*LR_Mono_K, where LR_Mono_K is a gain to adjust mono_diff_fuse, and mono_strg_lr is used to evaluate the strength of monotonicity in neighborhood of LR images.

The process then synthesizes the edge magnitudes of two normal directions, as follows:
edge_mag_lr=max(max(mag_hv, mag_ad)−Edge_Mag_Coring, 0)*Edge_Mag_K.
Edge_Mag_Coring is a coring to further adjust this difference, and Edge_Mag_K is a gain to adjust edge magnitude.

For a pixel in high resolution image, the process fetches its 3×3 neighborhood, whose pixels are pix_hr(i), i=0, 1, . . . , 8, pix_hr(4) is this pixel. It then projects it to the input low resolution image (1×) and get the corresponding 3×3 neighborhood, whose pixels are pix_lr(i), i=0, 1, . . . , 8. The selected neighborhood is the one whose pixels have the minimal distances with the projected position of pix_hr(4) in input LR image.

Figure 11:
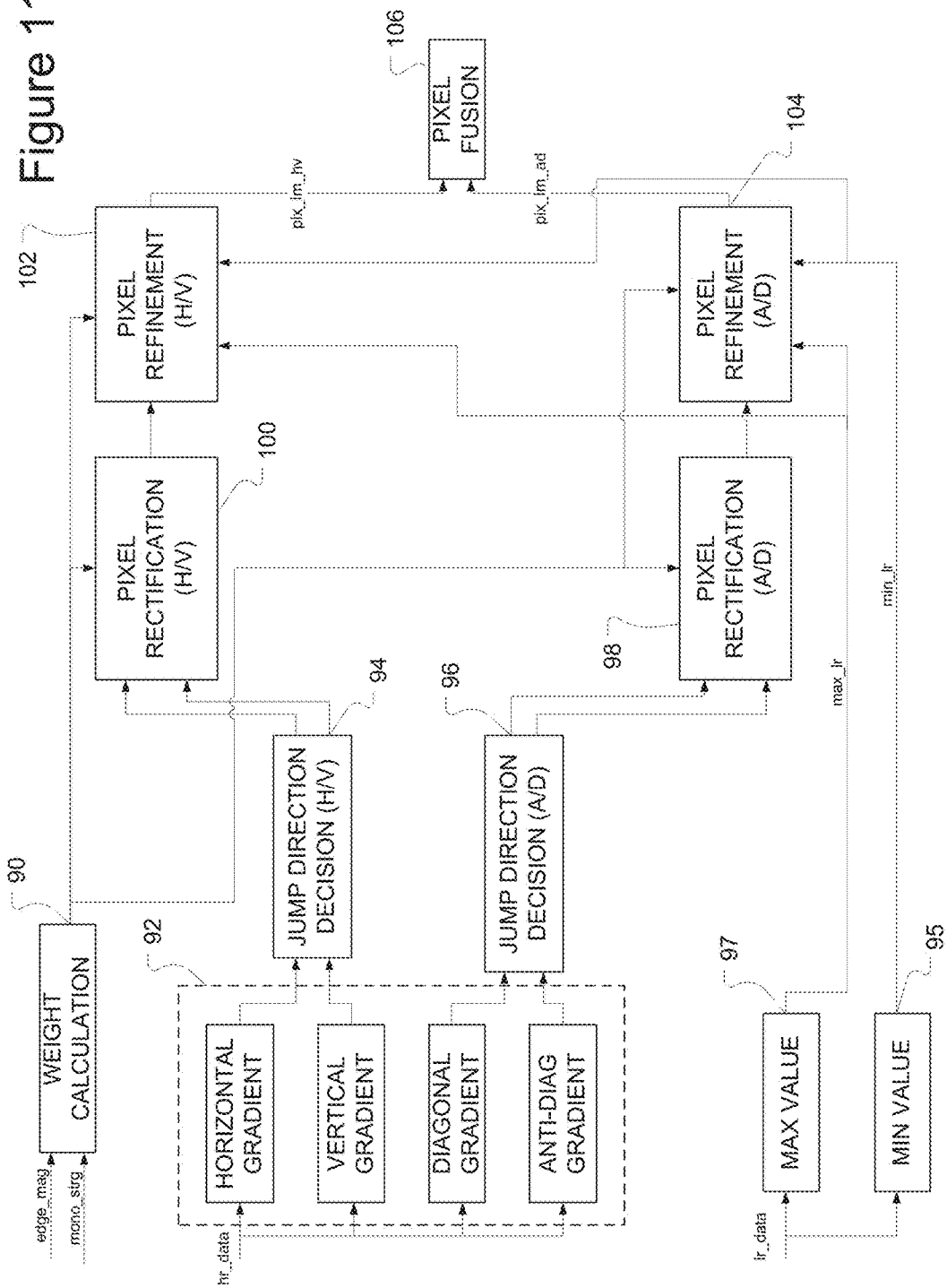
FIG. 11 shows an embodiment of a method of correcting a high resolution image to preserve monotonicity.

If the monotonicity in the LR 3×3 neighborhood is maintained, the HR 3×3 neighborhood should also preserve this monotonicity. If not, the central pixel of HR 3×3 neighborhood should be adjusted according to the pixel values in the normal direction of HR and those in the LR 3×3 neighborhood. An embodiment of a method of correcting high resolution image data that preserves monotonicity is shown in FIG. 11.

As before, two normal directions are considered. One is selected from horizontal and vertical directions; the other is selected from diagonal and anti-diagonal directions. The process fuses the results of these two directions at 106. The horizontal, vertical, diagonal and anti-diagonal gradient calculation at 92 is processed as previously discussed at 50, 52, 54, 56, except the processed data is pix_hr(i). The results are represented by hr_grad_h, hr_grad_v, hr_grad_d, and hr_grad_a that are then passed to the jump direction decisions 94 and 96, which will be discussed in more detail further.

At 95 and 97 the process finds the maximal and minimal pixel values (max_lr, min_lr) in LR 3×3 neighborhood around the projection position of pix_hr(4). In graphics super-resolution, a high resolution pixel should not exceed the pixel range of the LR 3×3 neighborhood by too much. These values are used as inputs to the pixel refinement and rectification processes at 98, 100, 102 and 104, discussed in more detail further.

Another input into the correction process is the weight calculation based upon the edge magnitude and monotonicity strength from LR neighborhood at 90. The process projects the current HR pixel to LR image and takes the closest 3×3 LR neighborhood. If this neighborhood has a strong edge and keeps its monotonicity in the normal direction, the process makes more adjustments to the current HR pixel. The process then calculates the edge weight edge_wgt according to the edge magnitude and normal monotonicity in LR 3×3 neighborhood.

In one embodiment, the process performs multiplication for each element for (i=0; i<9; i++) edge_info(i)= edge_mag_lr(i)*mono_strg_lr(i). The process then finds the maximum of the edge_info and multiplies it by a gain Edge_Wgt_K. This maximum is called edge_wgt which is limited to the range [0, 1]. The bigger edge_wgt is, the more adjustment the central HR pixel has.

Figure 12:
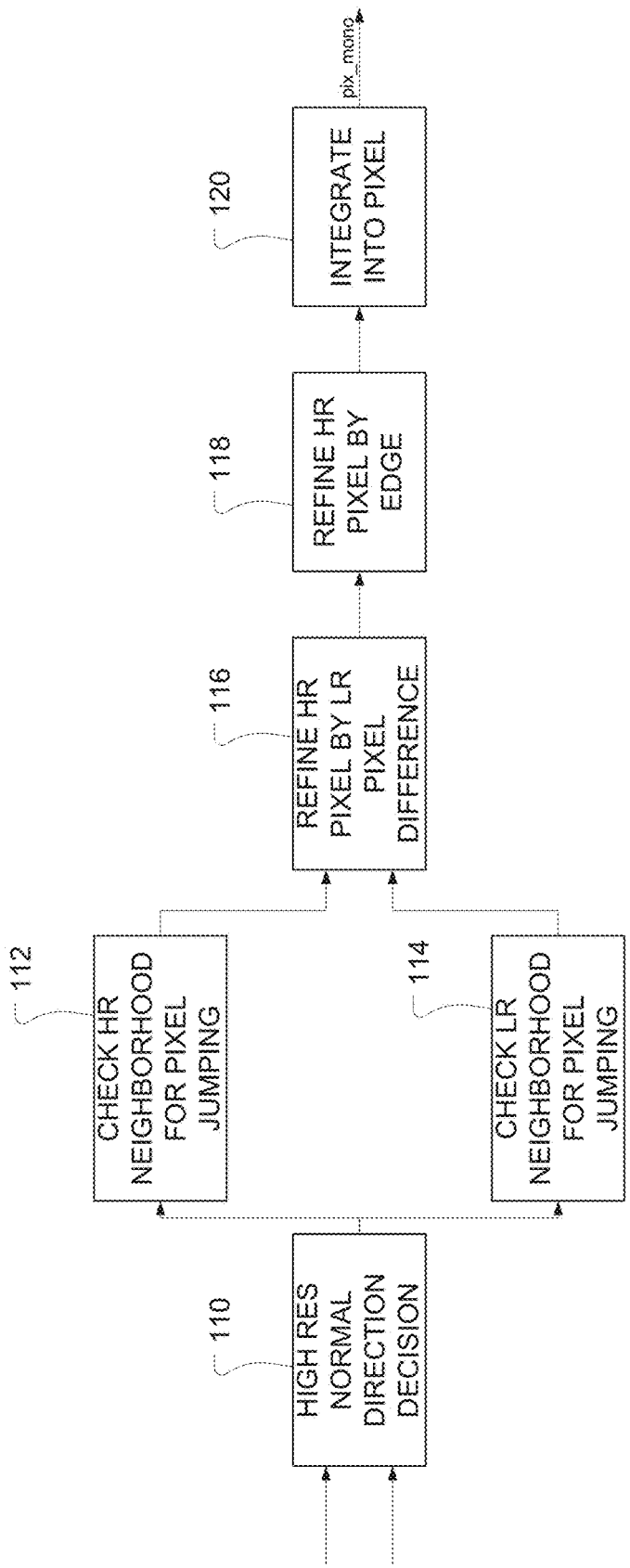
FIG. 12 shows an embodiment of a method of detecting pixel jumping and pixel rectification based on monotonicity.

In FIG. 11, the weight calculation 90, the max and min values 97 and 95 are provided directly to the pixel reactivation and/or the pixel refinement processes. The gradients found at 92 are inputs to a jump direction decision. A 'jump' occurs when a pixel in the HR data has a value beyond one extreme or the other, such as the maximum or minimum, rather than maintaining the monotonicity in the normal direction. FIG. 12 shows an embodiment of a jump direction decision process.

Using the gradients from the high resolution data at 92 in FIG. 11, the process in FIG. 12 determines the high resolution normal direction at 110. The process then checks whether there is pixel jumping in the normal direction of the HR neighborhood. If the central pixel of the HR 3×3 neighborhood is not the median value, which is named near_pix in the normal direction, pixel jumping exists in the neighborhood. The process then calculates the difference hr_diff between the median value and this central pixel. Otherwise, the central pixel is the median value, and there is no jumping, so hr_diff=0.

The process of FIG. 12 then checks whether there is pixel jumping in the same normal direction as the HR neighborhood in the LR 3×3 neighborhoods. The median value is found in the normal direction and the absolute difference abs_lr_diff between this median value and central pixels of the LR 3×3 neighborhood is calculated. If the central pixel is the median in LR 3×3 neighborhood, the monotonicity should be preserved in corresponding HR 3×3 neighborhood.

Notice, there are two groups of variables (near_pix, hr_diff, abs_lr_diff) in this section. One group is for a normal direction selected from horizontal and vertical directions, the other is for a normal direction selected from diagonal and anti-diagonal directions. The suffix "_hv" is used to identify horizontal/vertical normal direction, and the suffix "_ad" is used to identify diagonal/anti-diagonal normal direction. These suffixes follow those variables which are possessed by both normal directions.

The expected pixel in each normal direction in the HR image has to preserve its monotonicity if the LR neighborhood keeps monotonicity in this direction. It is reasonable to adjust the high resolution central pixel to approximate the near_pix (the median value) if the LR resolution central pixel approximates its median value.

After determining the pixel jumping status, in FIG. 12, the pixel rectification at 98 and 100 occur. The high resolution pixel is refined by the abs_lr_diff at 116. Generally, if there is no monotonicity in the normal direction of the LR neighborhood, the process makes little or no adjustment to the HR pixel. The difference in the HR pixel is adjusted by adj_hr_diff=max(abs(hr_diff)-LR_Jump_Delta_K*abs_lr_diff, 0). LR_Jump_Delta_K is a programmable parameter to adjust how fast the adjustment process turns off as the LR neighborhood becomes non-monotonic. As part of this process, the sign of adj_hr_diff should be same as that of original hr_diff. If hr_diff>0, then adj_hr_diff=max(adj_hr_diff, 0). Otherwise, adj_hr_diff=min(-adj_hr_diff, 0). Adj_hr_diff is refined based on the edge weight in the LR 3×3 neighborhood at 118. If the LR 3×3 neighborhood has monotonicity and a strong edge, then the process makes more adjustment to the original HR pixel as adj_hr_diff*=edge_wgt_lr. This is then integrated into pix_hr(4), such as by pix_mono=pix_hr(4)+adj_hr_diff at 120.

Figure 13:
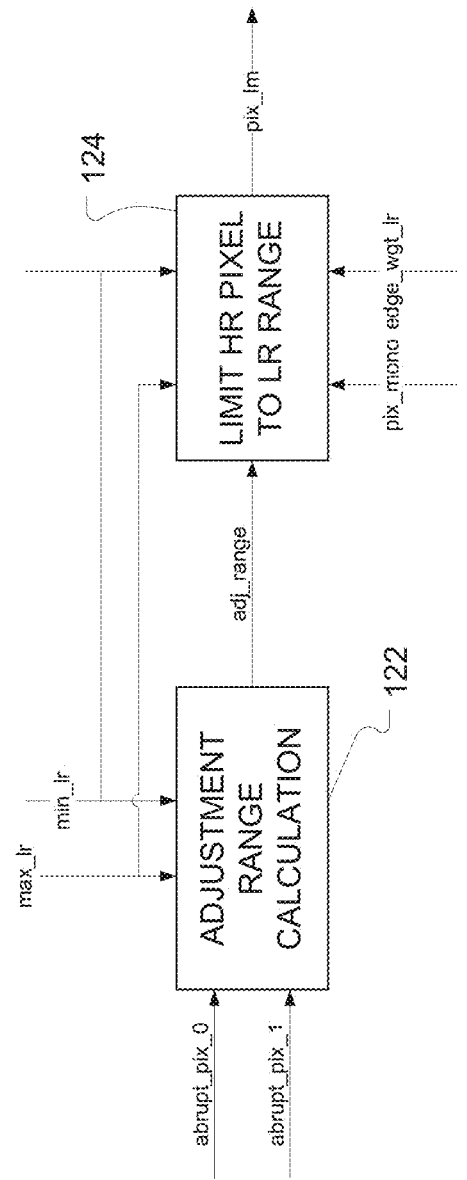
FIG. 13 shows an embodiment of a method of pixel refinement.

After the process of FIG. 12, many of the non-monotonic pixels in HR are corrected. However, if the structure of overshooting pixels in HR is very complex, abnormal, or even monotonic, the process may not correct these pixels using the techniques of FIG. 12. For example, if the normal direction is not exactly lined up to H/V or D/AD directions, the result from FIG. 12 may be not good enough. In some cases, the overshooting pixel in the HR image is often out of the pixel range of its projected LR 3×3 neighborhood. After the rectification 100 and 98 in FIG. 11, performed such as shown in FIG. 12, it is necessary to refine HR pixel further. When the current central HR pixel is projected to low resolution, there may be monotonic and strong edges in this LR 3×3 neighborhood. If so, it is better to make this HR pixel closer to the LR neighborhood range at 102 and 104 in FIG. 11. Pixels already in range will not be affected by this process. FIG. 13 shows an embodiment of the pixel refinement to adjust the pixel range.

The adjustment range calculation 122 receives the max and min low resolution from FIG. 11. If pix_mono is bigger than max_lr, the adjusted HR pixel should be close to max_lr, and the adjustment value is weighted by the refined edge weight of LR neighborhood, such as edge_wgt_ref=min(edge_wgt_lr, LR_Range_High_K). Here, LR_Range_High_K is a parameter to control giving how many adjustments to original HR pixels according to the LR range. It is less than 1 and bigger than 0. The resulting value pix_lm is found by pix_lm=pix_mono-max (pix_mono-(max_lr+adj_range), 0)*edge_wgt_ref.

If pix_mono is less than min_lr, the adjusted HR pixel should be close to min_lr, and the adjustment value is weighted by edge weight of LR neighborhood, such as by pix_lm=pix_mono+max((min pix_lr-adj_range)-pix_mono, 0)*edge_wgt_ref.

In the above formula, the adj_range is to evaluate how far the other HR pixels abrupt_pix_0 and abrupt_pix_1 in each normal direction are away from pixel range of the LR 3×3 neighborhood. For example, suppose the normal direction is horizontal, then abrupt_pix_0=pix_hr[3], abrupt_pix_1=pix_hr[5]. If the minimum of them is less than min_lr and maximum of them is bigger than max_lr, the process decreases the adjustment for pix_mono, that is, the adj_range is bigger than zero. Otherwise, the process keeps the adjustment for pix_mono, that is, the adj_range is zero.

The following process is done for both normal directions. If abrupt_pix_0<abrupt_pix_1, then adj_range=min(max (min_lr-abrupt_pix_0, 0), max(abrupt_pix_1-max_lr, 0)). Otherwise, adj_range=min(max(min_lr-abrupt_pix_1, 0), max(abrupt_pix_0-max_lr, 0)).

Returning to FIG. 11, the two refined pixels pix_lm_hv and pix_lm_ad are derived. These will then be fused. The process calculates the deltas between each of the refined pixels and the original central pixel in the HR 3×3 window:
pix_diff_hv=pix_lm_hv-pix_hr(4);
pix_diff_ad=pix_lm_ad-pix_hr(4).
The process calculates the refined HR pixel according to the signs of pix_diff_hv and pix_diff_ad as follows. If pix_diff_hv>0 and pix_diff_ad>0, then adj_pix_diff=max(pix_diff_hv, pix_diff_ad). If pix_diff_hv<0 and pix_diff_ad<0, then adj_pix_diff=min(pix_diff_hv, pix_diff_ad). Otherwise, adj_pix_diff=pix_diff_hv+pix_diff_ad. The refined HR pixel is pix_mp=pix_hr(4)+adj_pix_diff.

In this manner, pixels that are over filtered or otherwise over processed that result in artifacts in the high resolution image data are corrected. The preservation of at least some of the monotonicity and edges from the low resolution graphics image data to the high resolution graphics image data results from the application of the embodiments shown here. There may be instances in which some overshoot remains or the monotonicity is not consistent, but generally at least some level of monotonicity will be preserved.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:
1. A method of processing video data, comprising:
upscaling an input low resolution image to a high resolution image using a processor;
detecting monotonicity of pixel values in a direction normal to an edge in a low resolution neighborhood in the input low resolution image by:

calculating horizontal, vertical, diagonal and anti-diagonal gradients for the low resolution neighborhood;

grouping the horizontal and vertical gradients into a first gradient group, and grouping the diagonal anti-diagonal gradients into a second gradient;

detecting a first normal direction for the first gradient group; and detecting a second normal direction for the second gradient group; and correcting pixels in a high resolution neighborhood of the high resolution image corresponding to the low resolution neighborhood to preserve at least some of the monotonicity.

2. The method of claim 1, further comprising calculating a first edge magnitude for the first gradient group and a second edge magnitude for the second gradient group.

3. The method of claim 1, further comprising detecting pixel monotonicity for each of the first and second normal directions.

4. The method of claim 1, wherein detecting monotonicity comprises:

finding the direction normal to the edge; and determining an edge magnitude and a monotonicity strength.

5. The method of claim 1, wherein correcting pixels in the high resolution neighborhood comprises:

calculating edge weight based on the edge magnitude and monotonicity strength of low resolution neighborhood;

finding the maximum and minimum pixel values in low resolution neighborhood;

calculating horizontal, vertical, diagonal and anti-diagonal gradients for high resolution neighborhood;

grouping the horizontal and vertical gradients of high resolution neighborhood into a first gradient group, and grouping the diagonal and anti-diagonal gradients of high resolution neighborhood into a second gradient group;

detecting jump direction in high resolution neighborhood for the first gradient group;

detecting jump direction in high resolution neighborhood for the second gradient group;

rectifying high resolution pixel according to the jumping direction of high resolution neighborhood, and the monotonicity and the edge weight of low resolution neighborhood for the first gradient group;

rectifying high resolution pixel according to the jumping direction of high resolution neighborhood, and the monotonicity and the edge weight of low resolution neighborhood for the second gradient group;

refining high resolution pixel by limiting it to approximate the pixel value range in low resolution neighborhood for the first gradient group;

refining high resolution pixel by limiting it to approximate the pixel value range in low resolution neighborhood for the second gradient group; and fusing the refined high resolution pixels based on the sign of deltas between each of the refined high resolution pixels and the original central pixel in the high resolution neighborhood.

6. A method of generating high resolution image data, comprising:

receiving low resolution image data at a processor;

applying, using the processor, a super resolution process at least once to the low resolution image data to generate high resolution image data;

detecting monotonicity of pixel values in a direction normal to an edge in the low resolution image data by:

calculating horizontal, vertical, diagonal and anti-diagonal gradients for the low resolution neighborhood;

grouping the horizontal and vertical gradients into a first gradient group, and grouping the diagonal anti-diagonal gradients into a second gradient;

detecting a first normal direction for the first gradient group; and detecting a second normal direction for the second gradient group; and correcting the high resolution image data as needed to preserve at least some of the monotonicity.

7. The method of claim 6, wherein applying the super resolution process comprises iteratively applying the super resolution process to produce high resolution image data and the correcting occurs after a final iteration.

* * * * *